United States Patent
Dobrosielski

(10) Patent No.: US 6,550,027 B1
(45) Date of Patent: Apr. 15, 2003

(54) METHOD AND ARTICLE OF MANUFACTURE FOR DIFFERENTIATING BETWEEN A NON-VOLATILE MEMORY DEVICE AND AN EMULATOR FOR PURPOSES OF IN-CIRCUIT PROGRAMMING

(75) Inventor: Mark V. Dobrosielski, Bradford, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/579,595

(22) Filed: May 26, 2000

(51) Int. Cl.[7] .............................................. G11C 29/00
(52) U.S. Cl. ...................... 714/720; 714/719; 714/723
(58) Field of Search ................................ 714/720, 719, 714/718, 723; 365/230.01, 185.33; 712/41; 703/26

(56) References Cited

U.S. PATENT DOCUMENTS

| | | | |
|---|---|---|---|
| 4,691,316 A | 9/1987 | Phillips | 371/20 |
| 4,796,258 A | 1/1989 | Boyce et al. | 371/16 |
| 5,185,882 A | 2/1993 | White, Jr. et al. | 395/575 |
| 5,469,443 A * | 11/1995 | Saxena | 714/720 |
| 5,528,553 A * | 6/1996 | Saxena | 365/230.01 |
| 5,721,877 A | 2/1998 | Heflinger et al. | 395/500 |
| 5,768,563 A | 6/1998 | Porter et al. | 395/500 |
| 5,901,330 A | 5/1999 | Sun et al. | 395/828 |
| 5,964,875 A | 10/1999 | Autor et al. | 713/100 |
| 6,009,508 A * | 12/1999 | May et al. | 712/41 |
| 6,039,765 A * | 3/2000 | Trissel | 703/26 |
| 6,256,232 B1 * | 7/2001 | Chang et al. | 365/185.33 |

* cited by examiner

*Primary Examiner*—David Ton
(74) *Attorney, Agent, or Firm*—Testa, Hurwitz & Thibeault, LLP.

(57) ABSTRACT

The present invention relates to a method and an article of manufacture for differentiating between an in-circuit programming read-only memory ("ROM") and a ROM emulator for purposes of in-circuit programming. In one aspect, the invention relates to a method to determine whether a software program is executing in a non-volatile memory device or an emulator. The method includes reading a binary representation of a first value stored at a predetermined test location and changing the binary representation of the first value to create a binary representation of a second value. The method further includes writing the binary representation of the second value to the test location and reading a resulting value stored at the test location. The method further includes determining whether the resulting value corresponds to the first value or the second value.

17 Claims, 3 Drawing Sheets

METHOD AND ARTICLE OF MANUFACTURE FOR DIFFERENTIATING BETWEEN A NON-VOLATILE MEMORY DEVICE AND AN EMULATOR FOR PURPOSES OF IN-CIRCUIT PROGRAMMING

FIELD OF THE INVENTION

The present invention relates generally to the field of software. More specifically, this invention relates to a method and apparatus for identifying the software execution environment for the purpose of software program development.

BACKGROUND OF THE INVENTION

Software engineers often use read-only memory ("ROM") emulators to simplify the software development process. A ROM emulator is connected to the target system in place of the non-volatile memory devices that contain the executable code and certain types of data. This emulator also connects to a computer, and through this communication link the engineer can download revised, altered or additional code from the computer to the ROM emulator quickly and easily. The alternative is to program actual non-volatile memory devices with each code change, which is much more tedious and time consuming.

A problem with this approach has arisen in a system containing in-circuit programmable non-volatile memory devices (e.g., EEPROM or FLASH) that are replaced with a ROM emulator during software program development. The emulator does not behave like the actual non-volatile memory device. For example, a FLASH or EEPROM device requires special command sequences to be written to it to invoke the erase and reprogram algorithms. An emulator does not require any such command sequences. An emulator behaves just like RAM, with no special commands needed to alter its memory. Sending FLASH commands to an emulator would, in fact, alter the emulator memory in an undesirable way. Thus, it is a principle aspect of the present invention to determine whether a program is executing in a non-volatile memory device or an emulator.

SUMMARY OF THE INVENTION

The present invention relates to a method and an article of manufacture for differentiating between an in-circuit programmable read-only, non-volatile memory ("NVROM") and a ROM emulator for purposes of in-circuit programming. In one aspect, the invention relates to a method for determining whether a software program is executing in a non-volatile memory device or an emulator. The method includes reading a binary representation of a first value stored at a predetermined test location and changing the binary representation of the first value to create a binary representation of a second value. The method further includes writing the binary representation of the second value to that same predetermined test location and reading a resulting value stored at the test location. The method further includes determining whether the resulting value corresponds to the first value or the second value.

In one embodiment, the method also includes writing the binary representation of the first value to the test location if the resulting value corresponds to the second value. In another embodiment, the step of changing includes inverting the binary representation of the first value to create the second value. In another embodiment, the step of changing includes subtracting one from the binary representation of the first value to create the second value. In another embodiment, the method also includes determining a memory location that is not being used by the software program and selecting the memory location as the test location. In another embodiment, the method also includes determining a memory location that is a fixed, non-executable location and selecting the memory location as the test location. In another embodiment, the method also includes determining a memory location that is used by the software program to store a checksum value and selecting the memory location as the test location.

In another aspect, the invention relates to a method to determine whether a software program is executing in a non-volatile memory device or an emulator. The method includes selecting a memory location as a test location and reading a binary representation of a first value stored at the test location. The method further includes changing the binary representation of the first value to create a binary representation of a second value and writing the binary representation of the second value to the test location. The method further includes reading a resulting value stored at the test location and determining whether the resulting value corresponds to the first value or the second value.

In one embodiment, the method also includes writing the binary representation of the first value to the test location if the resulting value corresponds to the second value. In another embodiment, the step of changing includes inverting the binary representation of the first value to create the second value. In another embodiment, the step of changing includes subtracting one from the binary representation of the first value to create the second value. In another embodiment, the step of selecting a test location further includes determining a memory location that is a fixed, non-executable location and selecting the memory location as the test location. In another embodiment, the step of selecting a test location further includes determining a memory location that is not being used by the software program and selecting the memory location as the test location. In another embodiment, the step of selecting a test location further includes determining a memory location that is used by the software program to store a checksum value and selecting the memory location as the test location.

In yet another aspect, the invention relates to an article of manufacture having computer-readable program means embodied therein to determine whether a software program is executing in a non-volatile memory device or an emulator. The article of manufacture includes computer-readable program means for reading a binary representation of a first value stored at a test location and computer-readable program means for changing the binary representation of the first value to create a binary representation of a second value. The article of manufacture further includes computer-readable program means for writing the binary representation of the second value to the test location and computer-readable program means for reading a resulting value stored at the test location. The article of manufacture further includes computer-readable program means for determining whether the resulting value corresponds to the first value or the second value and computer-readable program means for writing the binary representation of the first value to the test location if the resulting value corresponds to the second value.

In one embodiment, the computer-readable program means for changing includes computer-readable program means for inverting the binary representation of the first value to create the second value. In another embodiment, the computer-readable program means for changing includes computer-readable program means for subtracting one from the binary representation of the first value to create the second value. In another embodiment, the article of manufacture also includes computer-readable program means for determining a memory location that is a fixed, non-executable location and selecting the memory location as the test location. In another embodiment, the article of manufacture also includes computer-readable program means for determining a memory location that is not being used by the software program and computer-readable program means for selecting the memory location as the test location. In another embodiment, the article of manufacture also includes computer-readable program means for determining a memory location that is used by the software program to store a checksum value and computer-readable program means for selecting the memory location as the test location.

BRIEF DESCRIPTION OF THE DRAWINGS

The foregoing and other objects, features and advantages of the present invention, as well as the invention itself, can be more fully understood from the following description of preferred embodiments, when read together with the accompanying drawings, in which.

DETAILED DESCRIPTION

Figure 1A:
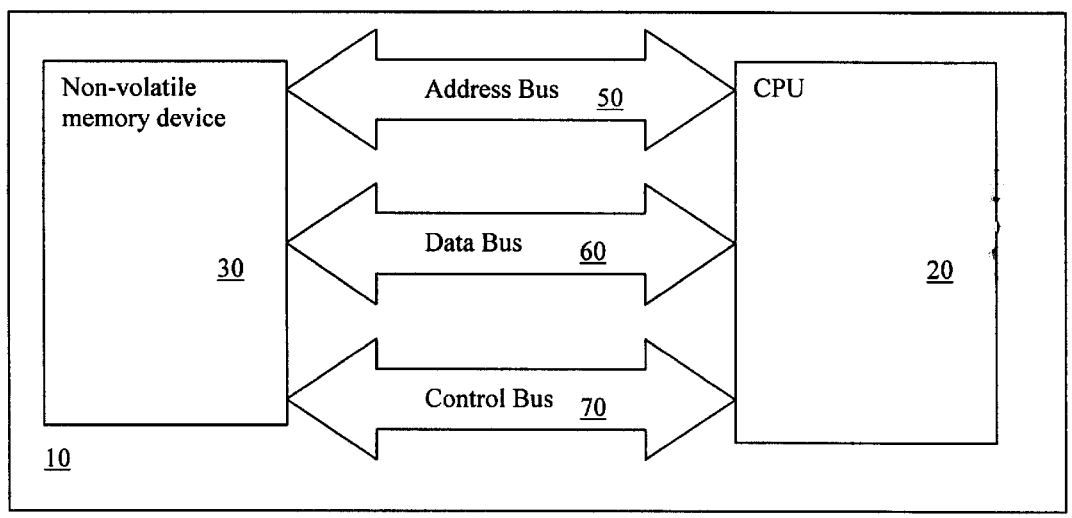
FIG. 1A is a block diagram depicting a CPU executing instructions from a software program in a non-volatile memory device.
Figure 1B:
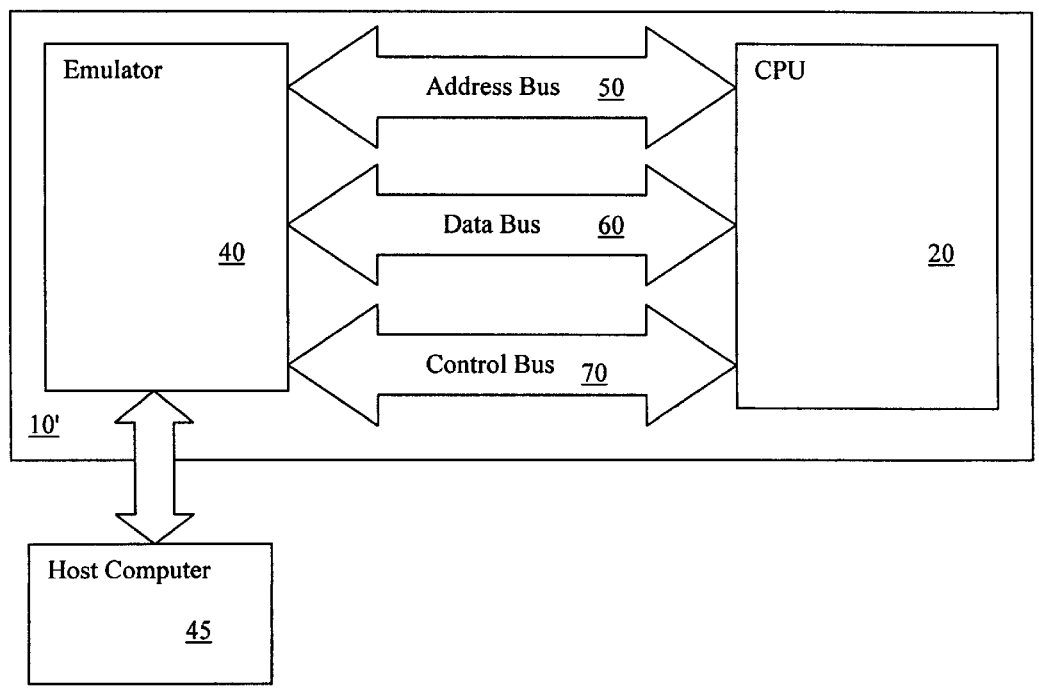
FIG. 1B is a block diagram depicting a CPU executing instructions from a software program in an emulator.

FIGS. 1A and 1B depict exemplary embodiments of configurations of processor boards 10, 10' during software program development. FIG 1A depicts a processor board 10 with a CPU 20 obtaining instructions from a software program residing in an in-circuit programmable non-volatile memory device 30 (e.g., EEPROM or FLASH). FIG. 1B depicts a processor board 10' with a CPU 20 obtaining instructions from a software program residing in a ROM emulator device 40 (e.g., Prom ICE, manufactured by Grammar Engine Inc. of Westerville, Ohio). The user communicates with the ROM emulator device 40 using a host computer 45. The CPU 20 performs reads from the device, either the non-volatile memory device 30 or the emulator device 40, using the address bus 50, the data bus 60 and the control bus 70. To write to the device, the CPU 20 must determine which device, either the non-volatile memory device 30 or the emulator device 40, is connected to the address bus 50, the data bus 60 and the control bus 70. The CPU 20 needs to differentiate between devices because, as stated above, the process to write to the device in order to change the resident software program is different depending on which device is being utilized.

Figure 2:
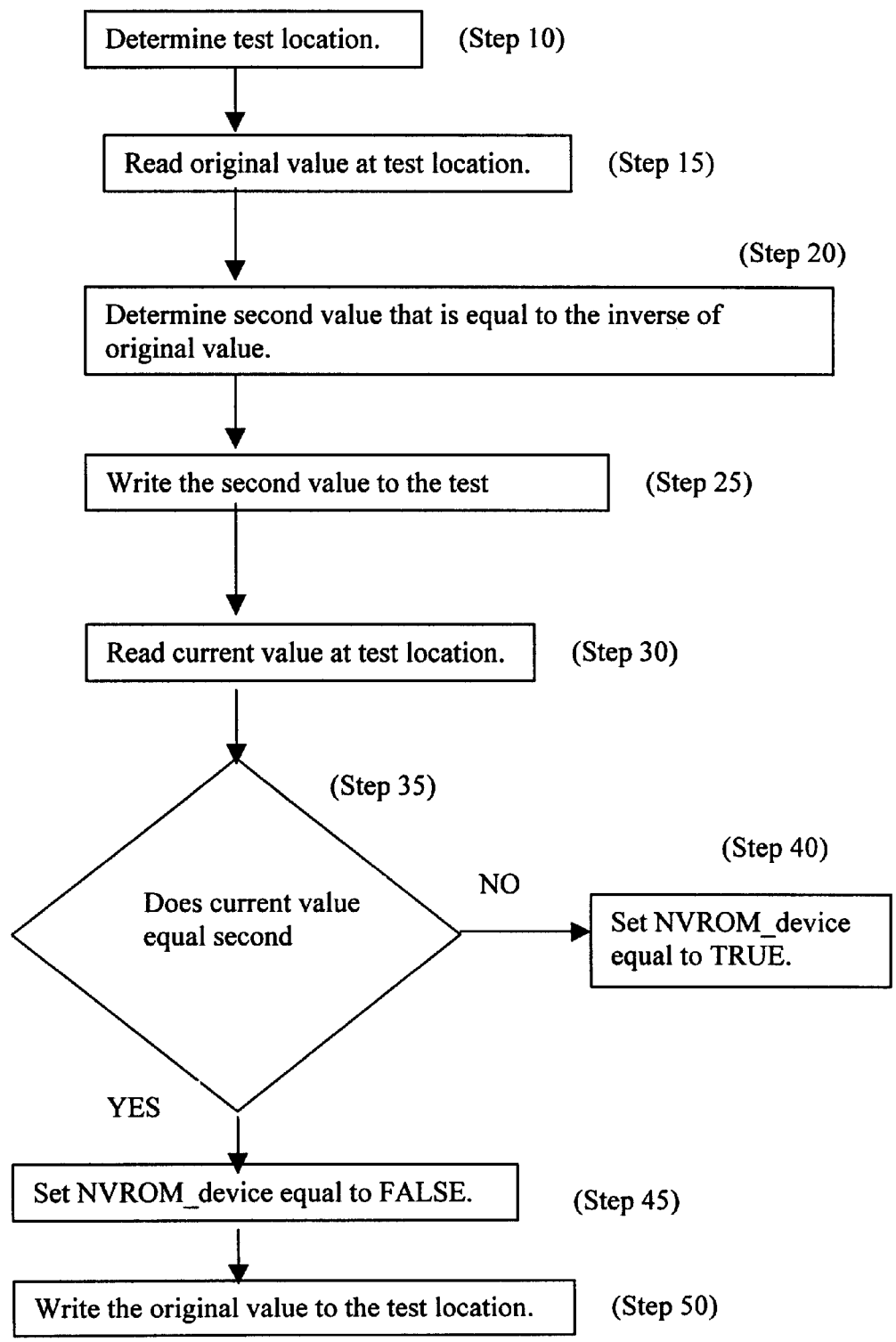
FIG. 2 is a block diagram of an embodiment of a memory map for the allocation of addressable memory location.

FIG. 2 depicts an exemplary embodiment of the method the CPU 20 uses to determine which device is connected. The user determines (step 10) the memory address of the test location. The user selects a predetermined memory address and communicates that address to the CPU 20.

Figure 3:
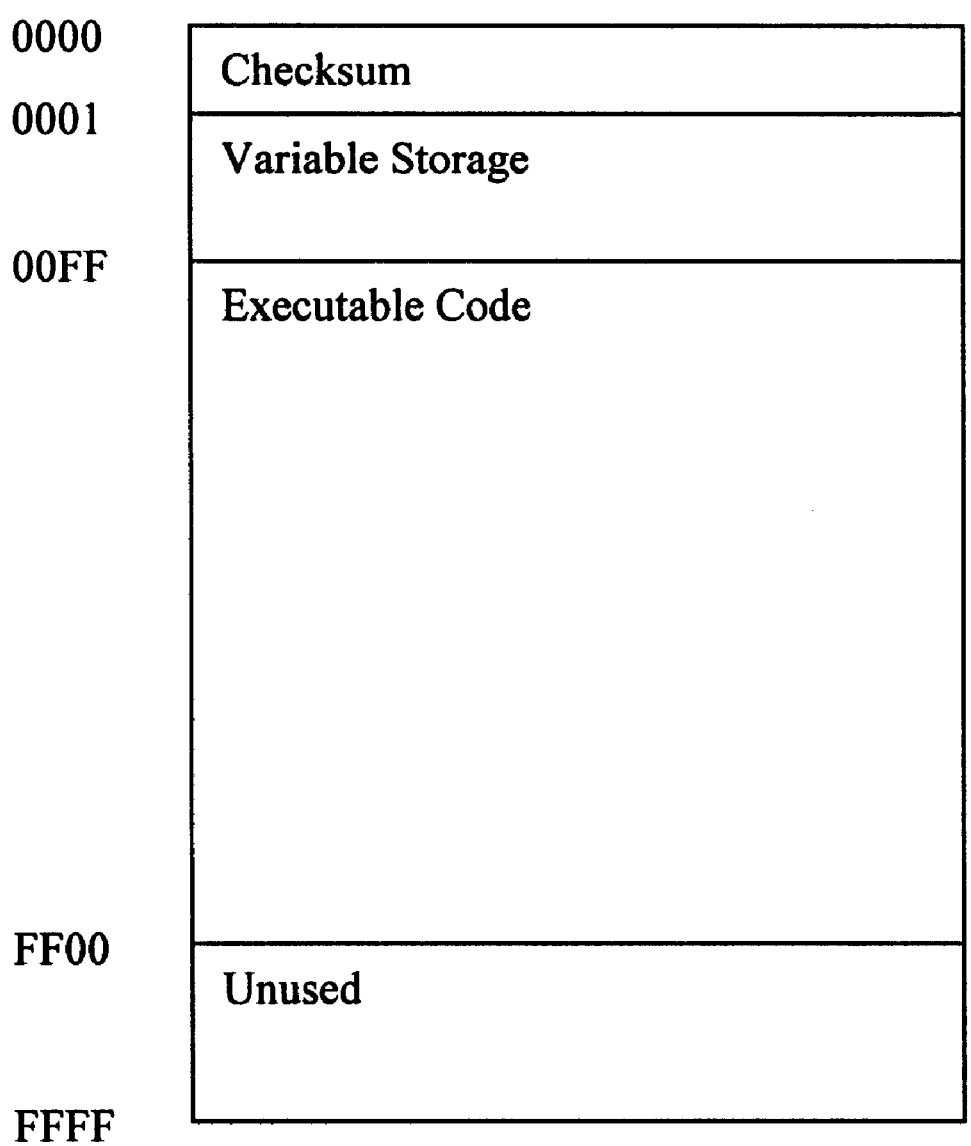
FIG. 3 is a flow diagram of an embodiment of a process to determine the memory environment in which the software is executing according to the invention.

The first part of this determination requires knowledge of how the addressable memory of the non-volatile memory device 30 is allocated. FIG. 3 depicts an exemplary embodiment of a memory map of the non-volatile memory device 30 (FIG. 1). The left-hand side of the figure contains the addressable memory range of the non-volatile memory device 30, where the addresses are represented in hexadecimal format. The right-hand side lists a general description of what is stored in the indicated memory address range. In this embodiment, there are unused memory locations from address FF00 to FFFF. One of these unused locations is chosen as the test location because, as described in more detail below, the value in the test location is changed. Changing an unused memory location does not affect the execution of the software program.

In other embodiments, there may be no unused locations of memory. For these embodiments, the location of the checksum can be selected as a test location. In FIG. 3, this corresponds to memory address 0000. Typically, a software program only uses this location at start-up and does not subsequently reference this location again during execution. Changing this memory location after start-up does not affect the execution of the software program. Alternatively, any memory location can be selected that is not executed by the software program (e.g., locations that don't contain instructions, but instead contain constant data).

Referring back to FIG. 2, once the test location has been determined, the CPU 20 reads (step 15) the value at that test location. The value that is read is referred to as the original value of the test location. The CPU 20 changes (step 20) the original value to come up with a second value. In the embodiment of FIG. 3, the CPU 20 takes the binary representation of the original value and inverts it to determine (step 20) the second value. Inverting is changing a zero to a one or a one to a zero. This step is necessary to ensure that the second value does not equal the original value, which could happen if the second value was predetermined. In another embodiment, the change can be accomplished by subtracting one from the original value. Any change mechanism can be used that ensures the second value is different than the original value. The CPU 20 writes (step 25) the second value into the test location. This write step will be successful only if the device is an emulator device 40. The emulator device 40, behaving like RAM, accepts the write and changes the test location as instructed by the CPU 20. The non-volatile memory device 30 needs the special command sequences to allow the CPU 20 to change the contents of the test location. Thus, if the device is a non-volatile memory device 30, the test location is not affected.

Subsequent to the write step, the CPU 20 reads (step 30) the value of the test location. The CPU 20 compares (step 35) the read value to the second value. If the read value does not equal the second value and the read value equals the original value, the CPU 20 could not write to the device. The CPU 20 sets (step 40) a flag (e.g., a global variable) that the device is a non-volatile memory device 30 and subsequently the CPU 20 can refer to that flag when needing to make a decision regarding the device. For example, if the CPU 20 wants to write to the device, the CPU 20 uses the flag to determine that there is a non-volatile memory device 30. With that determination, the CPU 20 executes the special command sequences to write to the non-volatile memory device 30. In another embodiment, a flag is not used.

If the read value equals the second value, the CPU 20 was able write to the device. The CPU 20 sets (step 45) the flag to indicate that the device is an emulator device 40. Since the test location was changed, the CPU 20 writes (step 50) the original value to the test location.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method to determine whether a software program is executing in a non-volatile memory device or an emulator, comprising:

reading a binary representation of a first value stored at a predetermined test location;

changing the binary representation of the first value to create a binary representation of a second value;

writing the binary representation of the second value to the test location;

reading a resulting value stored at the test location; and determining whether the resulting value corresponds to the first value or the second value.

2. The method of claim 1 further comprising writing the binary representation of the first value to the test location if the resulting value corresponds to the second value.

3. The method of claim 1 wherein the step of changing comprises inverting the binary representation of the first value to create the second value.

4. The method of claim 1 wherein the step of changing comprises subtracting one from the binary representation of the first value to create the second value.

5. The method of claim 1 further comprising:

determining a memory location that is not being used by the software program; and selecting the memory location as the test location.

6. The method of claim 1 further comprising:

determining a memory location that is used by the software program to store a checksum value; and selecting the memory location as the test location.

7. A method to determine whether a software program is executing in a non-volatile memory device or an emulator, comprising:

selecting a memory location as a test location;

reading a binary representation of a first value stored at the test location;

changing the binary representation of the first value to create a binary representation of a second value;

writing the binary representation of the second value to the test location;

reading a resulting value stored at the test location; and determining whether the resulting value corresponds to the first value or the second value.

8. The method of claim 7 further comprising writing the binary representation of the first value to the test location if the resulting value corresponds to the second value.

9. The method of claim 7 wherein the step of changing comprises inverting the binary representation of the first value to create the second value.

10. The method of claim 7 wherein the step of changing comprises subtracting one from the binary representation of the first value to create the second value.

11. The method of claim 7 wherein the step of selecting a test location further comprises:

determining a memory location that is not being used by the software program; and selecting the memory location as the test location.

12. The method of claim 7 wherein the step of selecting a test location further comprises:

determining a memory location that is used by the software program to store a checksum value; and selecting the memory location as the test location.

13. An article of manufacture having computer-readable program means embodied therein for determining whether a software program is executing in a non-volatile memory device or an emulator, comprising:

computer-readable program means for reading a binary representation of a first value stored at a test location;

computer-readable program means for changing the binary representation of the first value to create a binary representation of a second value;

computer-readable program means for writing the binary representation of the second value to the test location;

computer-readable program means for reading a resulting value stored at the test location;

computer-readable program means for determining whether the resulting value corresponds to the first value or the second value; and computer-readable program means for writing the binary representation of the first value to the test location if the resulting value corresponds to the second value.

14. The article of claim 13 wherein the computer-readable program means for changing comprises computer-readable program means for inverting the binary representation of the first value to create the second value.

15. The article of claim 13 wherein the computer-readable program means for changing comprises computer-readable program means for subtracting one from the binary representation of the first value to create the second value.

16. The article of claim 13 further comprising:

computer-readable program means for determining a memory location that is not being used by the software program; and computer-readable program means for selecting the memory location as the test location.

17. The article of claim 13 further comprising:

computer-readable program means for determining a memory location that is used by the software program to store a checksum value; and computer-readable program means for selecting the memory location as the test location.

* * * * *